United States Patent Office 2,816,061
Patented Dec. 10, 1957

2,816,061

SODIUM CARBOXYMETHYL CELLULOSE TABLET COATING

Dale W. Doerr, Chicago, Earl R. Serles, River Forest, and Dwight L. Deardorff, Glen Ellyn, Ill., assignors to University of Illinois Foundation, a non-profit corporation of Illinois No Drawing. Application May 27, 1954,
Serial No. 432,925

17 Claims. (Cl. 167—82)

This invention relates to a coating for medicinal tablets, and more particularly to a synthetic coating for such tablets which has as a main ingredient carboxymethyl cellulose.

Sugared coatings for medicinal tablets have long been in use for the purpose of masking unpleasant tastes, such as are found with quinine or atabrine; sealing odors such as are produced by vitamins; protecting the tablet from oxidation and from disintegration through moisture; improving the appearance of the tablet as where the tablet in its original state is mottled or spotted or where cascara compounds, aloes, hyroid ovarian compounds and the like are used; making possible attractive or distinctive coloring on the surface of the tablet, particularly for purposes of identifying the patricular drug used; and for rounding the tablet so that it may be swallowed easily.

In addition, sugar coated enteric coatings are often provided to prevent release of the drug in the gastric area and permit release in the duodenum or jejunum.

Despite the need for coatings, many difficulties have been encountered in their use. Thus, sugar coating requires a gradual build up of several dozen layers to increase the strength of the crystalline material. Again tablet markings or emblems are obliterated by conventional coatings.

The problem of the cost for standard coatings is especially formidable. For example, the total time required for the production of a suitable coating is often as high as sixty hours. Of this time, up to eighteen hours represents labor. In addition, the large bulk of the sugar coated tablets which is often about 50% greater than that of the uncoated tablets and their weight (often double that of uncoated tablets) mean that shipping costs and container costs are also extremely high.

Other difficulties encountered with standard tablet coatings are a low resistance to humidity so that the tablets deteriorate within a relatively short time; discoloration under conditions of high temperature; general lack of resistance to aging and abrasion; and powdering or comminution of coating layers during the coating process itself.

By means of using a coating having carboxymethyl cellulose as a main ingredient, most of the above disadvantages have been overcome.

Thus, the time required to produce a coating with carboxymethyl cellulose is in the neighborhood of eight hours as compared with sixty hours for traditional coatings. Of this time, one and one half hours are required for the actual labor.

The reduction in labor time is in part due to the fact that only a few coatings are required as opposed to the aforementioned several dozen coatings for the standard product.

The equipment needed for the production of the cellulose coating is no different from that required for conventional coatings.

At the same time, the coated product maintains the configuration of the basic tablet so that grooves, emblems and the like are preserved.

The cost of shipping and storing the material is greatly reduced by virtue of the fact that the weight of the carboxymethyl cellulose coated tablet is increased only 3% as compared with a 100% increase in weight with traditional coatings.

The taste of the carboxymethyl cellulose coated tablet and the protection with respect to undesirable odors and the like, as well as the appearance and protection with respect to vitamin ordors, and the like, compares favorably with the standard coatings.

The durability of the cellulose coated tablet, as indicated by a series of tests, is considerably greater than that of a tablet coated in the usual manner. Furthermore, the coating does not become soft and tacky under conditions of humidity and high temperature. The probable shelf life provided with cellulosic coating is greatly in excess of that for traditional tablets.

The carboxymethyl cellulose is low viscosity material, for example, type 70, (Hercules Powder Co.) sodium carboxymethyl cellulose. It is normally employed in 6.5% or less solution in aqueous alcohol. The alcohol water mix is preferably 50–50 by volume and preferably not over 55% alcohol and 45% water by volume.

While we have worked with the sodium salt and prefer it for economy's sake, the invention should not be limited thereto, but other nontoxic water soluble salts may be employed.

Referring now to the coating materials and procedures used, it has been found that although alcohol may be omitted in forming the carboxymethyl cellulose coatings, considerable stickiness and unevenness may result from such omission. The alcohol induces faster drying and substantially reduces the possibility of moisture penetration into the tablet itself, since the extent of moisture penetration is proportionate to the length of the drying period. It has been found that a hydro alcoholic solution of approximately 50% is most desirable. The maximum alcohol content is substantially 55%.

The proportion of carboxymethyl cellulose in the aqueous solution which has been found to give the best coatings is approximately 5% by weight although amounts up to 6.5% have been found to provide adequate coatings.

The use of proportions in excess of those indicated tends to increase the viscosity of the solution and may prevent even spreading as well as increasing the drying time.

In the first step of the process, a water resistant base or prime coat, which may suitably be of shellac of the type known as confectioners' glaze (wherein the arsenic has been removed) is applied, preferably after having been reduced to 30% w./w. The shellac is poured slowly over the tumbling charge from a graduate. Three coatings of shellac are applied in a preferred procedure, the drying and aging processes, therefor, being standard.

After the base coat or prime coat has been formed, and smoothed, the cellulosic derivative coating is applied, with a solution containing, as indicated above, approximately 5% of carboxymethyl cellulose in an aqueous solvent containing approximately 50% alcohol by volume. Suitable color may be added to the solution to improve appearance and/or to provide identification of the nature of the tablets.

As a specific example for a batch size of 3,882 grams (0.25 gram tablets from standard concave punches), a first coat of the cellulosic derivative of approximately 40 cc. was applied. 5% by weight of "low viscosity" sodium carboxymethyl cellulose was dissolved in a mixture of 50 cc. of ethyl alcohol (95%) and 50 cc. of water. The tablets were tumbled in a coating pan while the material was poured over them. This procedure is standard. The batch was pan dried for substantially four minutes without the application of hot air. A second coat, likewise formed from 40 cc. of the solution, was then applied and allowed to dry for substantially four minutes again. After this second four minute drying period, hot air was blown over the batch for approximately one half minute. A third coat was applied by the same procedure as was used with the second coat. Of course the size and character of the tablet make some difference in liquid requirements, but the operator will have no difficulty in avoiding overcoating.

The same quantity of solution was used for a fourth coat, but the initial drying period was continued for a period of five minutes and hot air applied again for one half minute. A fifth and final coat of the cellulosic was applied according to the same method as was used with the fourth coat.

The hot air (130° F.) drying was terminated when the movement of the load changed abruptly from tumbling to sliding in the pan.

The above procedure eliminates stickiness and unevenness in the individual layers and resulting coating. After the fifth coat had been added, the tablets were placed on an oven tray in the open and dried for several hours at room temperature.

As few as three or as many as seven layers of the sodium carboxymethyl cellulose may be applied. It has been found that granulation may occur when too many coats are used.

The next fundamental step in the process is the application of a polish coating. A suitable conventional polishing solution is a combination of white beeswax (0.09% w./w.) and carnauba wax (1.8% w./w.) in carbon tetrachloride. The wax solution is heated and then applied to the batch in a canvas lined buffing pan.

A preferred polish coating treatment with the foregoing solution involves the following steps. The first application may be made with 20 cc. of the solution and a two minute drying period; the second application may be made with 10 cc. of solution and a two minute drying period; the third application may be made with 5 cc. of solution and a three minute drying period; the fourth application may be made with 5 cc. of solution and a three minute drying period; and the fifth application may be made with 5 cc. of solution and a five minute drying period. In drying the polished coat, it is preferred that the use of hot air or of fan blown air be eliminated.

When the polish coat has been applied, the tablets are in their final form. The total working time required for all the steps has been only approximately one and one half hours, while the actual time consumed for the entire procedure is approximately eight hours.

The carboxymethyl cellulose has been used at concentrations as low as 3%, but normally there is no advantage in using lower concentrations since they add cost in drying and repetition.

The tablets which were formed according to the process outlined above were subjected to a number of tests in order to determine their durability.

The U. S. P. disintegration method was used to determine the relative times of disintegration of uncoated placebo tablets and tablets coated with carboxymethyl cellulose. This test indicated that the mean disintegration time for the uncoated placebo tablets was approximately thirty seconds, as compared to approximately fifty seconds for the carboxymethyl cellulose coated tablets.

The tablets were also subjected to a controlled humidity and temperature test. For this purpose, a sealed chamber having temperature and humidity controls was given an internal temperature of 105° F. and a relative humidity of 90%, the dew point being maintained at 101. These values were maintained within a 1% range of variation for one week.

Only minor interruptions of the environment of the chamber occurred, due to removal or replacement of the trays containing the samples. The test chamber encompassed 400 cubic feet, so that the aforementioned values were achieved within five minutes after opening and closing the chamber.

The commercial coated tablets began to show increasing deterioration after only nineteen hours, and at the end of one week were partially dissolved. In addition, samples of uncoated placebo and uncoated commercial tablets subjected to the conditions of the test chamber incurred powdering of their surfaces and in some instances as with certain glandular and vegetable drug tablets, complete disintegration occurred.

The conditions within the chamber left the cellulosic coated tablets substantially unimpaired, with the slight exception that they were somewhat more easily broken after the test than before it.

The cellulosic coated tablets were also subjected to aging tests. These tests involved placing the tablets in tightly capped flint glass bottles, which were then stored at room temperature as well as at comparison temperatures of 45, 10 and −5° C. After a period of six months no discernable changes had occurred in these tablets under any of the types of temperature conditions.

The cellulosic coated tablets were subjected to another variety of aging test wherein intermittent sunlight, heat, cold and vibration were applied to the glass bottles and tablets contained therein. Again the tablets retained their initial quality, with only a slight fading of the color of the coating noticeable after one and one half months in clear glass containers, but no fading at all in amber glass containers.

Both the cellulosic coated and standard coated tablets were also subjected to abrasion and mechanical stress by partially filling flint glass French square bottles with them and then agitating in a mechanical shaker. The tablets were inspected at intervals during a two hour shaking period.

Although both the standard tablets and the cellulosic coated tablets exhibited deterioration, the cellulosic coated tablets showed only minimal abrasion of the edges, whereas the commercially coated samples demonstrated up to 50% chipping. The color coating in some of the commercial samples was powdered off completely.

Finally, the tablets having cellulosic coating were compared with commercially sugar coated tablets for resistance to extreme heat. In this test, samples of each type of tablet were exposed for a period of eight hours to radiation from infrared lamps. The cellulosic coatings were not affected by the heat except for slight discoloration along the exposed sides thereof. After ten minutes, the commercial coatings began to crack, and these coatings were severely damaged at the end of five hours.

Normally, the preferred sodium carboxymethyl cellulose coatings will total about 3% of the total weight of the tablet. However, the use of 1% to 5% is well within the limits of the invention, depending to a large extent upon the size of the tablet, and its specific gravity.

The 3% coating by weight refers, for example, to a conventional starch-lactose placebo, standard convex shape 11/32 inch in major diameter, as produced by a standard concave punch, weighing 0.25 gram.

The preferred thickness of the film of cellulosic material is approximately one to two thousandths of an inch on the average.

The number of coats depends on a variety of factors, such as thickness. Evenness of color is usually important. Where it is not, the number of coats may be reduced sometimes even below three.

The above detailed description has been given for clearness of understanding only. No unnecessary limitations should be understood therefrom, as modifications will be obvious to those skilled in the art.

We claim:

1. A medicinal tablet resistant to abrasion and high temperatures and high humidity comprising a table body having a thin coat having a composition consisting essentially of sodium carboxymethyl cellulose, the coated tablet having essentially the configuration of the basic tablet.

2. A medicinal tablet resistant to abrasion and high temperatures and high humidity comprising a tablet body having a thin coat having a composition consisting essentially of sodium carboxymethyl cellulose, said coat being about 0.001 to 0.002 inches thick.

3. A medicinal tablet resistant to abrasion and high temperatures and high humidity comprising a tablet body having a thin coat having a composition consisting essentially of sodium carboxymethyl cellulose, said coat constituting not more than 5% by weight of the finished tablet.

4. A medicinal tablet resistant to abrasion and high temperatures and high humidity comprising a tablet body having a thin base coat of a water resistant material and over the base coat a thin coat having a composition consisting essentially of sodium carboxymethyl cellulose, said coat of sodium carboxymethyl cellulose constituting not more than 5% by weight of the finished tablet.

5. The tablet of claim 4 in which the water resistant material is shellac.

6. A medicinal tablet resistant to abrasion and high temperatures and high humidity comprising a tablet body of organic material, part of which is water-soluble, a water resistant thin base coat on the tablet body and a thin coat having a composition consisting essentially of sodium carboxymethyl cellulose on the base coat.

7. The tablet of claim 6 in which the base coat is shellac and the sodium carboxymethyl cellulose is not more than 5% by weight of the finished tablet.

8. A medicinal tablet resistant to abrasion and high temperatures and high humidity comprising a tablet body of organic material, part of which is water-soluble, having a marking, emblem or groove configuration on the surface of the tablet body, a water resistant thin base coat on the tablet body, and a thin, continuous coat consisting essentially of sodium carboxymethyl cellulose on the base coat, said base and cellulose coats not significantly masking the configuration.

9. The tablet of claim 8 in which the cellulose coat is not more than 5% by weight of the finished tablet.

10. A medicinal tablet resistant to abrasion and high temperatures and high humidity comprising a tablet body of organic material, part of which is water-soluble, and a thin coat having a composition consisting essentially of sodium carboxymethyl cellulose on the tablet.

11. The tablet of claim 10 in which the cellulose coat is not more than 5% by weight of the finished tablet.

12. The process of coating tablets which comprises tumbling a batch of tablets, applying a coating solution of sodium carboxymethyl cellulose to the tumbling tablets, said coating solution comprising an aqueous solution containing alcohol in an amount up to about 55% by weight and up to 6.5% by weight of sodium carboxymethyl cellulose, continuing the tumbling until the coat is uniformly distributed on the tablets, and drying the tablets.

13. The process of coating tablets which comprises tumbling a batch of tablets, applying a thin coat of shellac, drying the shellac coat, applying a coating solution of sodium carboxymethyl cellulose to the tumbling shellac coated tablets, said coating solution comprising an aqueous solution containing alcohol in an amount up to about 55% by weight and up to 6.5% by weight of sodium carboxymethyl cellulose, continuing the tumbling until the cellulose coat is uniformly distributed on the tablets, and drying the tablets, the coat of sodium carboxymethyl cellulose so applied being not more than 5% by weight of the finished tablet.

14. The process of coating tablets which comprises tumbling a batch of tablets made of organic material, part of which material is water-soluble, applying a thin base coat of a water resistant material, drying the base coat, applying a coating solution of sodium carboxymethyl cellulose to the tumbling base coated tablets, said cellulose solution comprising an aqueous solution containing alcohol in an amount up to 55% by weight and up to 6.5% by weight of sodium carboxymethyl cellulose, continuing the tumbling until the cellulose coat is uniformly distributed on the tablets, and drying the tablets, the coat of sodium carboxymethyl cellulose so applied being not more than 5% by weight of the finished tablet.

15. The process of coating tablets to protect them against abrasion, high temperatures and high humidity without obliterating embossed or engraved configurations on the tablet body surface which comprises tumbling a batch of tablets having embossed or engraved configurations thereon, applying a coating solution of sodium carboxymethyl cellulose to the tumbling tablets and drying the tablets.

16. The process of coating tablets which comprises tumbling a batch of tablets made of organic material, part of which is water-soluble, applying a thin base coat of a water resistant material to the tablets, drying the base coat, applying a coating solution of sodium carboxymethyl cellulose to the tumbling base coated tablets, continuing the tumbling until the cellulose coat is uniformly distributed on the tablets, and drying the tablets.

17. The process of coating tablets which comprises applying a thin base coat of a water resistant material to a batch of tablets made of organic material, part of which is water-soluble, drying the base coat, applying a coating solution of sodium carboxymethyl cellulose to the base coated tablets, and drying the tablets.

References Cited in the file of this patent

UNITED STATES PATENTS

| | | |
|---|---|---|
| 2,196,769 | Hiatt | Apr. 9, 1940 |
| 2,591,742 | Thomas et al. | Apr. 8, 1952 |
| 2,693,437 | Spradling | Nov. 2, 1954 |
| 2,787,579 | Van der Weel | Apr. 2, 1957 |

OTHER REFERENCES

Hollabaugh et al.: "Carboxymethyl Cellulose . . . Uses and Applications," Ind. and Eng. Chem., vol. 37, No. 10, October 1945, pp. 943–947.

UNITED STATES PATENT OFFICE
CERTIFICATE OF CORRECTION

Patent No. 2,816,061　　　　　　　　　　　　　　　　　　　　December 10, 1957

Dale W. Doerr et al.

It is hereby certified that error appears in the printed specification of the above numbered patent requiring correction and that the said Letters Patent should read as corrected below.

Column 1, line 26, for "hyroid" read -- thyroid --; column 2, line 11, for "ordors" read -- odors --; column 3, line 34, for "0.09%" read -- 0.9% --; column 5, line 3, for "table" read -- tablet --; column 6, line 52, list of references cited, under the heading "UNITED STATES PATENTS", for the patent number "2,196,769" read -- 2,196,768 --.

Signed and sealed this 11th day of February 1958.

(SEAL)
Attest:
KARL H. AXLINE
　　Attesting Officer

ROBERT C. WATSON
Commissioner of Patents